United States Patent [19]
Otsuka

[11] Patent Number: 5,425,031
[45] Date of Patent: Jun. 13, 1995

[54] MOBILE RADIO COMMUNICATION SYSTEM

[75] Inventor: Shigeru Otsuka, Tokyo, Japan

[73] Assignee: NEC Corporation, Tokyo, Japan

[21] Appl. No.: 158,700

[22] Filed: Nov. 29, 1993

[30] Foreign Application Priority Data

Nov. 27, 1992 [JP] Japan .................................. 4-317636

[51] Int. Cl.6 ......................................... H04Q 11/04
[52] U.S. Cl. ................. 370/95.1; 370/95.3;
370/58.2; 370/110.1; 370/118; 379/59; 379/60;
455/33.1
[58] Field of Search ................. 370/58.2, 59, 63, 64,
370/95.1, 95.3, 110.1, 118; 379/59, 60;
455/33.1; 381/29-31

[56] References Cited

U.S. PATENT DOCUMENTS

| | | | |
|---|---|---|---|
| 4,837,800 | 6/1989 | Freeburg et al. | 370/59 |
| 4,949,395 | 8/1990 | Rydbeck | 455/33.1 |
| 5,077,741 | 12/1991 | Kotzin | 455/33.1 |
| 5,111,454 | 5/1992 | Hung et al. | 370/95.3 |
| 5,121,391 | 6/1992 | Paneth et al. | 370/95.1 |

FOREIGN PATENT DOCUMENTS

| | | | |
|---|---|---|---|
| 0168647 | 1/1986 | European Pat. Off. | H04Q 7/04 |
| 0536544 | 4/1993 | European Pat. Off. | H04Q 7/04 |

OTHER PUBLICATIONS

Commutation et Transmission, vol. 14, No. 1, 1992, Paris, France, pp. 21-28, XP257949 Varin et al., 'Alcatel 900 A paneuropean cellular radiotelephone system', p. 22, middle col., line 1-right col., line 50; FIG. 1; p. 24, middle col., line 1-p. 25, middle col., line 1; FIG. 3.

Telecom Report, vol. 15, No. 2, Apr. 1992, Munchen DE pp. 92-95, XP274593; Dittrich et al., 'Datenndienste im GSM-Mobilfunksystem', p. 92, left col., line 26-p. 93, right col., line 28; FIGS. 1, 2.

IEICE Transactions, vol. E75, No. 12, Dec. 1992, Tokyo JP, pp. 1702-1709, XP339157 Yabusaki et al., 'Voice Communication Connection Control in Digital Public Land Mobile Networks', paragraph 2.2; FIG. 3.

European Search Report dated Oct. 20, 1994.

Primary Examiner—Douglas W. Olms
Assistant Examiner—Russell W. Blum
Attorney, Agent, or Firm—Ostrolenk, Faber, Gerb & Soffen

[57] ABSTRACT

A multiplex audio signal from an exchange apparatus is demultiplexed by a first multiplexer/demultiplexer into demultiplexed signals that are supplied to a first switch circuit which switches between transmission paths to apply the demultiplexed signals to a plurality of audio coding circuits. Certain output signals from the audio coding circuits are supplied to a second switch circuit, time-division-multiplexed, and applied to the first switch circuit. The multiplexed signal is outputted from the first switch circuit for transmission in a given time slot over a radio communication path.

8 Claims, 5 Drawing Sheets

MOBILE RADIO COMMUNICATION SYSTEM

BACKGROUND OF THE INVENTION

1. Field of the Invention

The present invention relates to a mobile radio communication system, and more particularly to a digital mobile radio communication system having a service area composed of a plurality of radio zones for automobile telephone terminals.

2. Description of the Prior Art

FIG. 1 of the accompanying drawings shows in block form a general mobile radio communication system for use in automobile radio communications or the like.

The mobile radio communication system shown in FIG. 1 comprises a plurality of mobile stations 100-1 ~ 100-j, a plurality of radio base stations 101-1, 101-2 for effecting radio communication with the mobile stations 100-1 ~ 100-j through radio communication paths or circuits using radio frequencies, and a host switching office 104 composed of a base station controller 102 and an exchange apparatus 103. The base station controller 102 controls the radio base stations 101-1, 101-2, and connects calls to and from the mobile stations 100-1 ~ 100-j through the radio base stations 101-1, 101-2. The exchange apparatus 103 selects communication lines with switching circuits to send communication signals supplied from the mobile stations 100-1 ~ 100-j through the radio base stations 101-1, 101-2 and the base station controller 102 to a public communication network, and also to send communication signals supplied from the public communication network through the base station controller 102 and the radio base stations 101-1, 101-2 to the mobile stations 100-1 ~ 100-j.

The radio base station 101, identical to each of the radio base stations 101-1, 101-2, and the base station controller 102 are shown in block form in FIG. 2 of the accompanying drawings. FIG. 3 of the accompanying drawings illustrates signals which are demultiplexed from a multiplex signal by a multiplexer/demultiplexer 9 (see FIG. 2) in the base station controller 102.

As shown in FIG. 2, multiplexer/demultiplexer 9 is supplied with a multiplex signal that is transmitted from the exchange apparatus 103 at a transmission rate of 2 Mbps, and demultiplexes the supplied multiplex signal into signals S1-1, S1-2, ..., S1-k at 64 Kbps for use in a time-division switching operation. As shown in FIG. 3, these demultiplexed signals 22 are time-division signals composed of 32 time slots TS0 ~ TS31. Each of the time slots TS0 ~ TS31 has auxiliary time slots TS0(R), TS1(R), TS2(R) (R indicates RADIO time slot) for accommodating audio/data signals for mobile radio communication in four channels or control signals for controlling the connection of calls. The base station controller 102 also has a switch circuit 7 which is a time-division switching switch for separating the demultiplexed signals for the radio base station 101-1 or 101-2 and transmitter/receivers capable of communicating with corresponding mobile stations covered by the radio base station.

A control signal processor 11 sends control signals to and receives control signals from the mobile stations through the radio base station 101 to control switch circuit 7. The base station controller 102 further includes a first group of CODECs (coder-decoders) 12-11, 12-12, 12-13 corresponding to a transmitter/receiver 3-1 in the radio base station 101, a second group of CODECs 12-21, 12-22, 12-23 corresponding to a transmitter/receiver 3-2 in the radio base station 101, and an nth group of CODECs 12-n1, 12-n2, 12-n3 corresponding to a transmitter/receiver 3-n in the radio base station 101. Each of the groups of CODECs serves to convert distributed signals of 64 Kbps outputted from switch circuit 7 into signals a1, a2, ..., an of 16 Kbps to be distributed for radio communication in the mobile radio communication system. The number k of the demultiplexed signals S1-1, S1-2, ..., S1-k outputted from multiplexer/demultiplexer 9 differs from the number n of the CODEC groups because not all of the 32 time slots of the multiplex signal of 2 Mbps are used, and the number n of the CODEC groups may be greater or smaller than the number of the time slots depending on the system configuration.

As shown in FIG. 3, each of the signals a1, a2, ..., an to be distributed for radio communication has auxiliary time slots TS0(R) ~ TS3(R) for four channels. Usually, the auxiliary time slots TS0(R) ~ TS2(R) are assigned audio/data signals to be transmitted to the mobile station, and the auxiliary time slot TS3(R) is assigned a monitor signal for rate conversion. A call connecting signal a0 is not converted with respect to the transmission rate, but inserted in a time slot for the mobile station to which a call is to be connected, e.g., the auxiliary time slot TS0(R) if it is an empty slot, in the corresponding transmitter/receiver in the radio base station 101 to which it is supplied through a multiplexer/demultiplexer 6 in the base station controller 102. The multiplexer/demultiplexer 6 multiplexes the output signals a1, a2, ..., an from the CODEC groups and the call connecting signal a0, and transmits a multiplex signal to the radio base station 101.

In FIG. 2, only one output signal line is shown as extending from multiplexer/demultiplexer 6. Actually, however, multiplexer/demultiplexer 6 has as many output signal lines as the number of the radio base stations. Switch circuit 7 determines which radio base station the multiplex signal is to be transmitted to, under the control of a control unit 13 which is capable of detecting which mobile station the radio base station 101 is communicating with and also of determining which radio base station the signals of 16 Kbps generated by the CODECs are to be transmitted to.

The base station controller 102 is geographically spaced from the radio base stations 101-1 ~ 101-2 by several tens of kilometers and communicates with the radio base stations which cover a number of indefinite mobile stations. Therefore, the mobile radio communication system employs a serial signal of 2 Mbps. Though the mobile radio communication system is assumed to employ a serial signal of 2 Mbps for transmission between the exchange apparatus 103 and the base station controller 102 or between the base station controller 102 and the radio base stations 101-1, 101-2, it may employ a serial signal of 1.5 Mbps or a signal of 8 Mbps or 6 Mbps at a higher hierarchical level.

As shown in FIG. 3, the multiplex signal transmitted to the radio base station 101 is composed of 32 time slots TS0 ~ TS31. Each of the time slots TS0 ~ TS31, for example, the time slot TS1, comprises auxiliary time slots TS0(R) ~ TS3(R) for accommodating audio/data signals. In this conventional mobile radio communication system, however, the time slot TS3(R) is not used to accommodate a coded audio signal, but to accommodate a monitor/control signal for the CODECs. The control signal processor 11 sends a control signal for connecting calls to and from the mobile stations through switch circuit 7 and a signal line for the call connecting signal a0 to multiplexer/demultiplexer 6. The control signal is then multiplexed and allotted to a certain time slot of the multiplex signal of 2 Mbps by multiplexer/demultiplexer 6, and transmitted to the radio base station 101. The control unit 13 sends a switching control signal to switch circuit 7 and also controls the control signal processor 11 for controlling transmission and reception of control signals to and from the exchange apparatus 103 or the mobile stations.

The radio base station 101 comprises a multiplexer/demultiplexer 5, transmitter/receivers 3-1 ~3-n, a control signal processor 4, a combiner/distributor 2 for combining signals to be transmitted from the transmitter/receivers 3-1 ~3-n and distributing received signals to the transmitter/receivers 3-1 ~3-n. The multiplexer/demultiplexer 5 demultiplexes the multiplex signal from the base station controller 102 into signals a1, a2, . . . , an, and supplies the signals a1, a2, . . . , an to the respective transmitter/receivers 3-1 ~3-n. The transmitter/receivers 3-1 ~3-n process the supplied signals a1, a2, . . . , an, using as one group the auxiliary time slots TS0(R) ~TS2(R) contained in a given time slot of the multiplex signal of 2 Mbps, for transmission over radio communication paths. More specifically, as shown in FIG. 4 of the accompanying drawings, the transmitter/receivers 3-1 ~3-n process the signal in each of the auxiliary time slots TS0(R) ~TS2(R) by adding an error correcting code to the signal for recovery from bit errors which may be introduced during transmission over the radio communication paths and interleaving the signal, and add a start word (SW) signal indicative of an identification of the time slot over the radio circuits to the signal. The control signal a0 for connecting a call from the base station controller 102 is demultiplexed by multiplexer/demultiplexer 5, received by the control signal processor 4, and then transmitted in a certain time slot from a certain transmitter/receiver to a mobile station.

The conventional base station controller 102 has CODECs in one-to-one correspondence to the time slots outputted from the respective transmitter/receivers over the radio communication paths. In a system in which three time slots (see FIG. 4) are time-division-multiplexed over the radio circuits, a signal of 64 Kbps composed of time-division-multiplexed output signals from three CODECs is supplied to the transmitter/receivers. Since the CODEC corresponding to the time slot used for controlling the connection of a call over a radio communication path is in use, that CODEC is idling and not effectively utilized.

SUMMARY OF THE INVENTION

It is therefore an object of the present invention to provide a mobile radio communication system which can effectively utilize a CODEC corresponding to a time slot used for controlling the connection of a call over a radio communication path or circuit.

To achieve the above object, there is provided a mobile radio communication system comprising a plurality of mobile stations, a plurality of radio base stations for communicating with the mobile stations through radio communication paths, and a base station controller for controlling the radio base stations to connect calls to and from the mobile stations through the radio base stations, the base station controller comprising first switch means for switching between the transmission paths, first multiplexing/demultiplexing means provided between the first switch means and an exchange apparatus for demultiplexing a multiplex signal from the exchange apparatus, outputting demultiplexed signals to the first switch means, multiplexing output signals from the first switch means into a multiplex signal, and transmitting the multiplex signal to the exchange apparatus, second multiplexing/demultiplexing means provided between the first switch means and the radio base stations for multiplexing output signals from the first switch means into a multiplex signal, transmitting the multiplex signal to the radio base stations, and demultiplexing a multiplex signal from the radio base stations outputting demultiplexed signals to the first switch means, a plurality of audio coding means connected to the first switch means for converting an audio data signal transmitted from the exchange apparatus and outputted by the first switch means into a coded audio data signal at a lower rate for mobile communication, and second switch means for time-division-multiplexing given output signals from the audio coding means into a multiplex signal and outputting the multiplex signal to the first switch means.

Certain output signals from the audio coding means are time-division-multiplexed by the second switch means, and the multiplexed signal is supplied to the first switch means, which transmits the multiplexed signal for communication with a transmitter/receiver. The audio coding means can thus be effectively utilized.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 5:
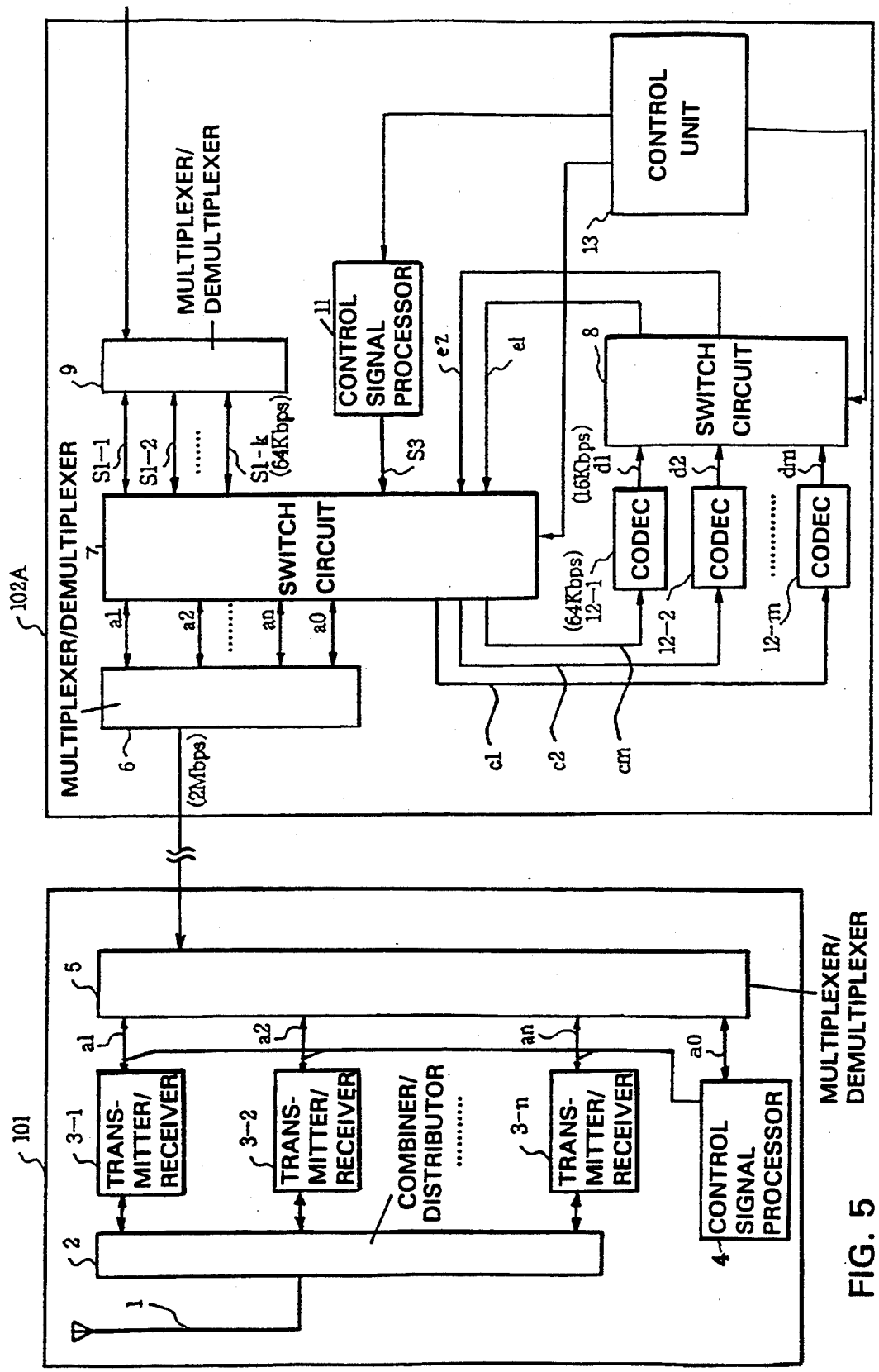
FIG. 5 is a block diagram of a radio base station and a base station controller in a mobile radio communication system according to the present invention.

As shown in FIG. 5, a mobile radio communication system according to the present invention has a radio base station 101 and a base station controller 102A.

Figure 1:
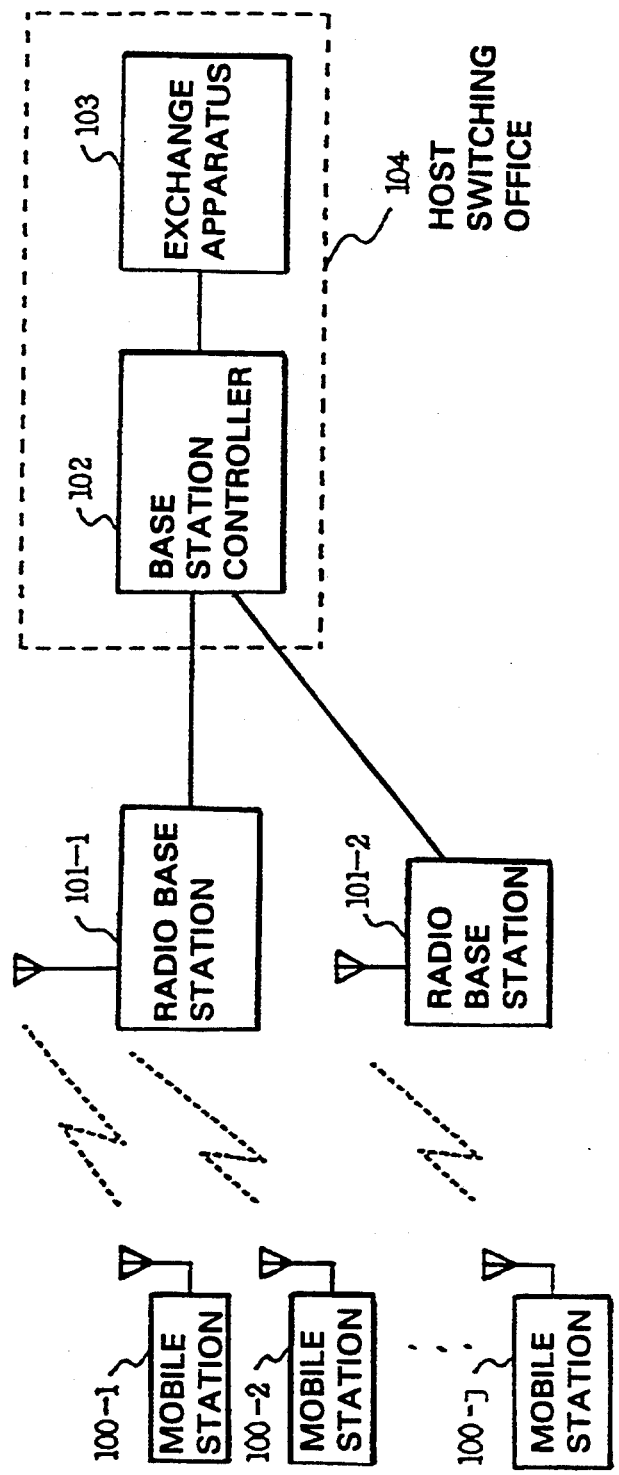
FIG. 1 is a block diagram of a general mobile radio communication system.
Figure 2:
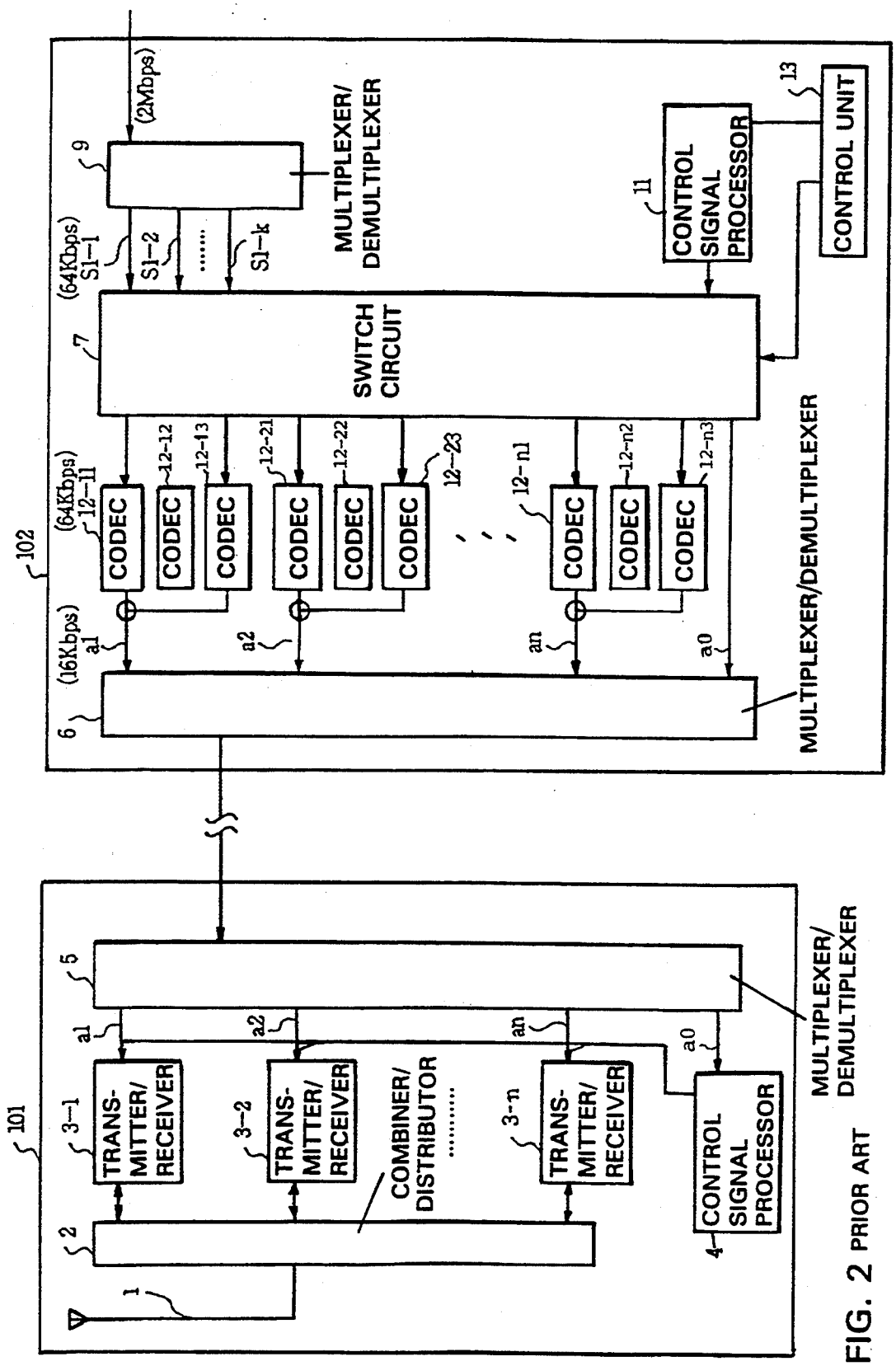
FIG. 2 is a block diagram of a radio base station and a base station controller in the mobile radio communication system shown in FIG. 1.
Figure 3:
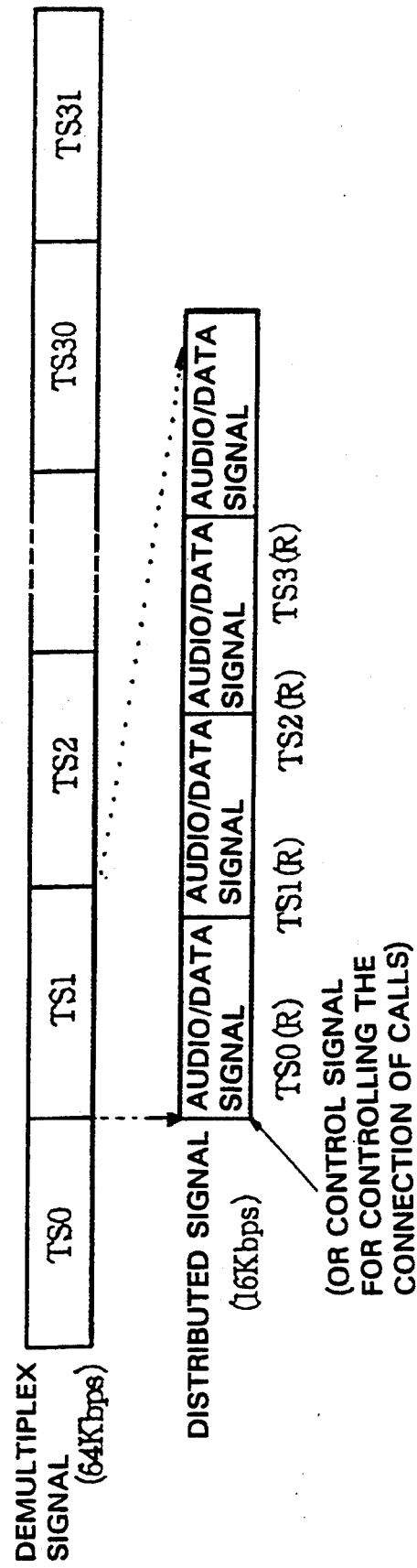
FIG. 3 is a diagram showing the formats of signals used between the base station controller and the radio base station.
Figure 4:
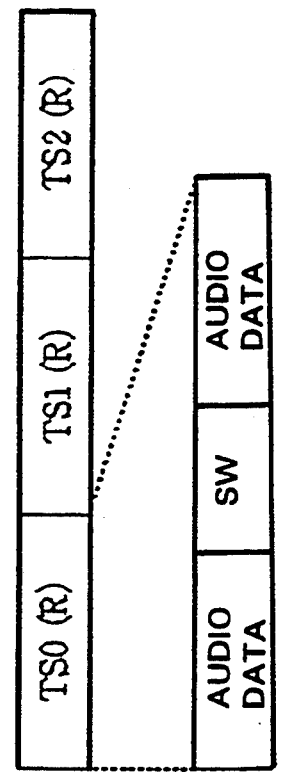
FIG. 4 is a diagram showing the format of a signal over a radio communication path.

The radio base station 101 is identical to the radio base station 101 shown in FIG. 2. The base station controller 102A differs from the base station controller 102 shown in FIG. 2 in that it has a switch circuit 8 and a plurality of CODECs 12-1, 12-2, . . . , 12-m, rather than the CODECs 12-11 ~12-13, 12-21 ~12-23, . . . , 12-n1 ~12n3. The number m of CODECs 12-1, 12-2, . . . , 12-m is equal to or less than the number k of output signals S1-1 ~S1-k from multiplexer/demultiplexer 9.

Figure 6:
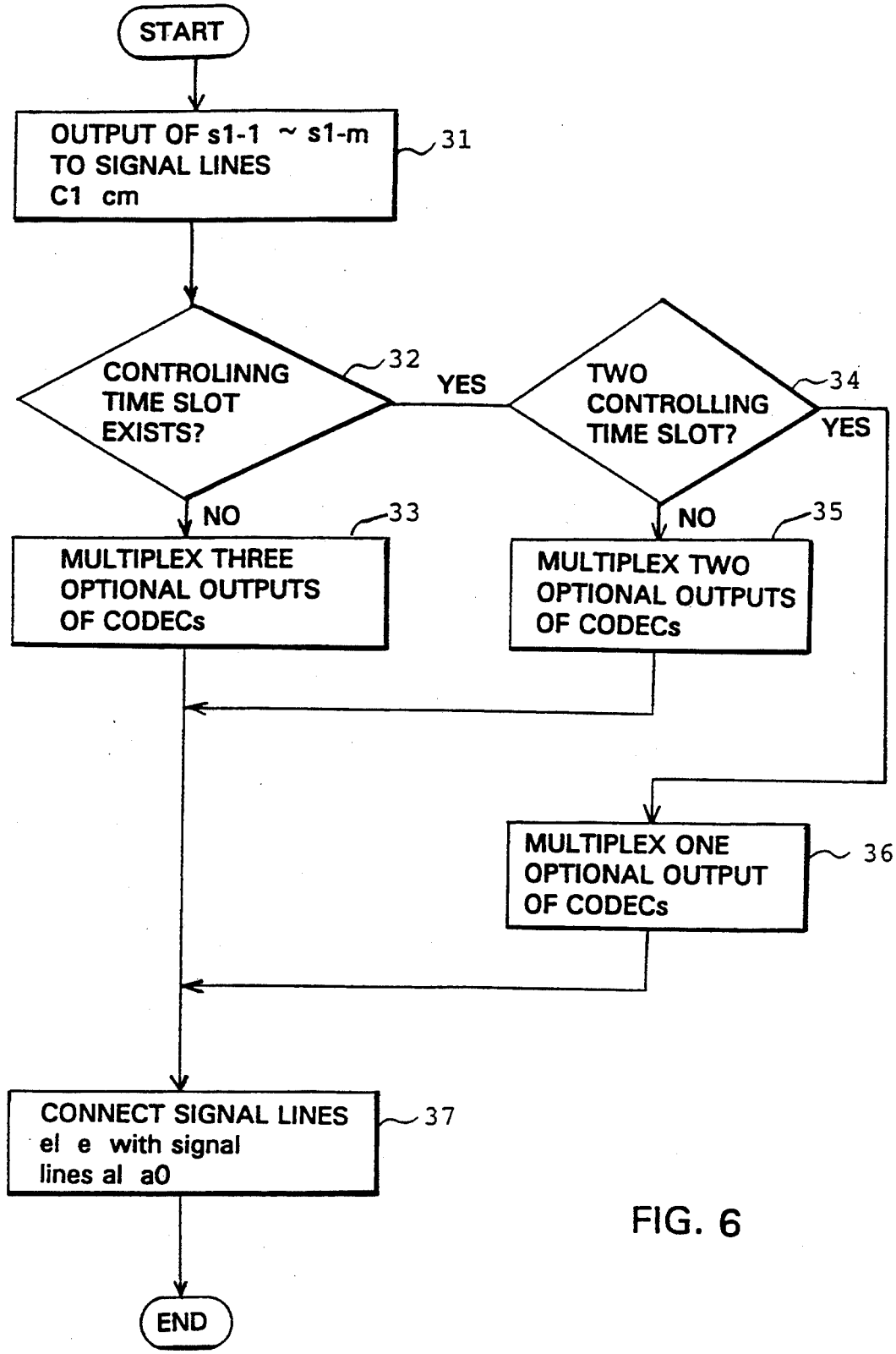
FIG. 6 is a flowchart showing the operation of switch circuits 7 and 8.

Operation of the radio base station 101 and the base station controller 102A will be described below with reference to FIG. 6. The multiplexer/demultiplexer 9 receives the multiplex signal of 2 Mbps from the exchange apparatus 103, demultiplexes the multiplex signal into a plurality of signals S1-1, S1-2, ..., S1-k of 64 Kbps, and outputs the signals S1-1, S1-2, ..., S1-k to switch circuit 7. Switch circuit 7 supplies the signals S1-1, S1-2, ..., S1-k from multiplexer/demultiplexer 9 to signal lines C1, C2, ..., Cm connected respectively to the CODECs 12-1, 12-2, ..., 12-m in a step 31. The audio signals of 64 Kbps from the exchange apparatus 103 are converted by the CODECs 12-1, 12-2, ..., 12-m into signals of 16 Kbps, which are applied as signals d1 ~dm to switch circuit 8. Switch circuit 8 is controlled by the control unit 13 to select the signals d1 ~dm from the CODECs 12-1, 12-2, ..., 12-m and multiplex them into a signal of 64 Kbps which is applied to switch circuit 7 through signal lines e1 ~el. Specifically, in the absence of a controlling time slot, switch circuit 8 multiplexes the output signals from three of the CODECs and outputs the multiplex signal to the signal lines e1 ~el in steps 32, 33. If there is one controlling time slot, switch circuit 8 multiplexes the output signals from two of the CODECs and outputs the multiplex signal to the signal line e1 ~el in steps 34, 35. If there are two controlling time slots, switch circuit 8 outputs the output signal from one of the CODECs to the signal line e1 in steps 34, 36. Switch circuit 7 connects the signal lines e1 ~el from switch circuit 8 to any one of the signal lines a1, a2, ..., an of switch circuit 7 in a step 37.

In this embodiment, three signals of 16 Kbps are multiplexed and the multiplex signal is applied to the signal lines e1 ~el which are connected to either one of the signal lines a1 ~an by switch circuit 7. Therefore, the multiplex signal is supplied to multiplexer/demultiplexer 6, which multiplexes and transmits the supplied signal to the radio base station 101. Over the radio communication paths, the time slot signals of the multiplex signal of 2 Mbps from multiplexer/demultiplexer 6 are transmitted from the transmitter/receivers 3-1 ~3-n of the radio base station 101. When the output signals d1 ~dm from the respective CODECs 2-1 ~2-m are multiplexed and selected, the control unit 13 controls switch circuit 7 not to connect the CODEC corresponding to the time slot in which a control signal is transmitted over the radio communication path. A call connecting signal from the control signal processor 11 that is controlled by the control unit 13 is supplied through a signal line S3 to switch circuit 7, selected by switch circuit 7, supplied through a signal line a0 to multiplexer/demultiplexer 6, multiplexed by multiplexer/demultiplexer 6, and transmitted to the radio base station 101.

The control unit 13 determines, as system parameters, the number of transmitter/receivers which transmit and receive the control signal and the number of time slots in which the control signal is transmitted and received. These system parameters may be altered during operation of the mobile radio communication system. The number n of the output signal lines a1 ~an of switch circuit 7 and the number p of multiplex time slots of 2 Mbps between the base station controller 102A and the radio base station 101 are not the same number. Specifically, the number p is smaller than the number n (p <n).

In the radio base station 101, the digital multiplex signal from the base station controller 102A is received by multiplexer/demultiplexer 5, and demultiplexed into signals that are outputted through the respective signal lines a1 ~an to the transmitter/receivers 3-1 ~3-n, respectively. The transmitter/receivers 3-1 ~3-n add an error correcting code to the received data TS0(R) ~TS2(R) from the base station controller 102A, interleave the received data TS0(R) ~TS2(R), and then transmit the processed data to the mobile stations. The call connecting signal transmitted from the base station controller 102A is also received by multiplexer/demultiplexer 5 and sent through a signal line a0 to the control signal processor 4. The control signal processor 4 supplies the control signal to a transmitter/receiver which is assigned. In response to the command from the control signal processor 4, the transmitter/receiver transmits and receives the control signal in one of the time slots.

In the above embodiment, the foregoing explanation relates to the processing of only signals from the exchange apparatus 103 to the radio base station 101. However, signals from the radio base station 101 to the exchange apparatus 103 may similarly be processed. While switch circuit 8 supplied with the output signals from the CODECs 12-1 ~12-m and switch circuit 7 supplied with signals of 64 Kbps are separate from each other in the illustrated embodiment, switch circuit 7 may be arranged to additionally perform the function of switch circuit 8. Switch circuit 7, which is shown as selecting the signals of 64 Kbps in the illustrated embodiment, may comprise a time-division switch (TDSW) for processing a signal of 2 Mbps applied to switch circuit 7.

Although a certain preferred embodiment of the present invention has been shown and described in detail, it should be understood that various changes and modifications may be made therein without departing from the scope of the appended claims.

What is claimed is:

1. A mobile radio communication system comprising:
   a plurality of mobile stations;
   a plurality of radio base stations for communicating with the mobile stations through radio communication paths;
   a base station controller for controlling said radio base stations to connect calls to and from said mobile stations through said radio base stations;
   said base station controller comprising:
   first switch means for providing transmission paths between inputs and outputs thereof;
   first multiplexing/demultiplexing means provided between said first switch means and an exchange apparatus for demultiplexing a multiplex signal from an exchange apparatus, outputting demultiplexed signals to said first switch means, multiplexing output signals from said first switch means into a multiplex signal, and transmitting the multiplex signal to the exchange apparatus;
   second multiplexing/demultiplexing means provided between said first switch means and said radio base stations for multiplexing output signals from said first switch means into a multiplex signal, transmitting the multiplex signal to said radio base stations, demultiplexing a multiplex signal from said radio base stations, and outputting demultiplexed signals to said first switch means;
   a plurality of audio coding means connected to said first switch means, for converting an audio data signal transmitted from the exchange apparatus and outputted by said first switch means into a coded audio data signal at a lower rate for mobile communication; and second switch means for time-division-multiplexing given output signals from said audio coding means into a multiplex signal, and outputting the multiplex signal to said first switch means.

2. The mobile radio communication system according to claim 1, wherein said first switch means comprises switch means for switching between signals of 64 Kbps.

3. The mobile radio communication system according to claim 1, wherein said second switch means is integrally combined with said first switch means.

4. The mobile radio communication system according to claim 1 wherein said second switch means include means for multiplexing three optional outputs among outputs of said audio coding means if there is no controlling time slot, means for multiplexing two optional outputs among outputs of said audio coding means if there is one controlling time slot, and means for outputting one optional output among outputs of said audio coding means if there are two controlling time slots.

5. A base station controller for a mobile radio communication system comprising a plurality of mobile stations; and a plurality of radio base stations for communicating with the mobile stations through radio communication paths;

the base station controller controlling said radio base stations to connect calls to and from said mobile stations through said radio base stations;

said base station controller comprising:

first switch means for providing transmission paths between inputs and outputs thereof;

first multiplexing/demultiplexing means provided between said first switch means and an exchange apparatus for demultiplexing a multiplex signal from an exchange apparatus, outputting demultiplexed signals to said first switch means, multiplexing output signals from said first switch means into a multiplex signal, and transmitting the multiplex signal to the exchange apparatus;

second multiplexing/demultiplexing means provided between said first switch means and said radio base stations for multiplexing output signals from said first switch means into a multiplex signal, transmitting the multiplex signal to said radio base stations, demultiplexing a multiplex signal from said radio base stations, and outputting demultiplexed signals to said first switch means;

a plurality of audio coding means connected to said first switch means, for converting an audio data signal transmitted from the exchange apparatus and outputted by said first switch means into a coded audio data signal at a lower rate for mobile communication; and second switch means for time-division-multiplexing given output signals from said audio coding means into a multiplex signal, and outputting the multiplex signal to said first switch means.

6. The base station controller according to claim 5, wherein said first switch means comprises switch means for switching between signals of 64 Kbps.

7. The base station controller according to claim 5, wherein said second switch means is integrally combined with said first switch means.

8. The base station controller according to claim 5, wherein said second switch means includes means for multiplexing three optional outputs among outputs of said audio coding means if there is no controlling time slot, means for multiplexing two optional outputs among outputs of said audio coding means if there is one controlling time slot, and means for outputting one optional output among outputs of said audio coding means if there are two controlling time slots.

* * * * *